(12) United States Patent
Fukui

(10) Patent No.: US 12,498,720 B2
(45) Date of Patent: Dec. 16, 2025

(54) VEHICLE CONTROL APPARATUS, VEHICLE CONTROL METHOD, AND PROGRAM THEREOF

(71) Applicant: TOYOTA JIDOSHA KABUSHIKI KAISHA, Toyota (JP)

(72) Inventor: Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 18/338,945

(22) Filed: Jun. 21, 2023

(65) Prior Publication Data

US 2024/0053751 A1    Feb. 15, 2024

(30) Foreign Application Priority Data

Aug. 12, 2022  (JP) ................................ 2022-128929

(51) Int. Cl.
*G05D 1/00*  (2024.01)
*G06T 7/60*  (2017.01)
*G06V 20/58*  (2022.01)

(52) U.S. Cl.
CPC ............. *G05D 1/021* (2013.01); *G06T 7/60* (2013.01); *G06V 20/58* (2022.01); *G06V 2201/07* (2022.01)

(58) Field of Classification Search
CPC .......... G05D 1/021; G06T 7/60; G06V 20/58; G06V 2201/07; B60W 30/09; B60W 30/0956; B60W 40/105; B60Q 9/008
See application file for complete search history.

(56) References Cited

U.S. PATENT DOCUMENTS

| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2015/0153735 | A1* | 6/2015 | Clarke ................... G01C 11/04 701/301 |
| 2018/0162387 | A1* | 6/2018 | Sung ..................... B60W 30/09 |
| 2018/0370526 | A1* | 12/2018 | Ohmura ............... G06V 20/584 |

(Continued)

FOREIGN PATENT DOCUMENTS

| JP | 2019-016825 A | 1/2019 |
| JP | 2020-117128 A | 8/2020 |

(Continued)

*Primary Examiner* — Ig T An
(74) *Attorney, Agent, or Firm* — Sughrue Mion, PLLC

(57) ABSTRACT

An ECU of a vehicle control apparatus obtains, using a frontward PVM camera, front side target object information that includes information on a target object that is located in a blind angle detection area lateral to and outside of a target object detection area of a frontward camera. The ECU specifies, based on the front side target object information, a kind and a moving state of a blind angle target object, and determines a front side obstacle area based on the kind and moving state of the blind angle target object. When the ECU determines that a target object whose kind and moving state coincide with the kind and the moving state, respectively, to which the front side obstacle area corresponds is located in the front side obstacle area, the ECU decreases a driving force to suppress a start of moving of the host vehicle.

3 Claims, 8 Drawing Sheets

(56) References Cited

U.S. PATENT DOCUMENTS

| | | |
|---|---|---|
| 2019/0001968 A1 | 1/2019 | Yorifuji et al. |
| 2019/0106103 A1* | 4/2019 | Inoue ..................... B60K 31/02 |
| 2020/0114886 A1* | 4/2020 | Kim ..................... G05D 1/0276 |
| 2020/0242936 A1 | 7/2020 | Matsunaga et al. |
| 2021/0061309 A1 | 3/2021 | Kawanai |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2022/0032955 A1 | 2/2022 | Xiang et al. |
| 2022/0171275 A1 | 6/2022 | Iida et al. |

FOREIGN PATENT DOCUMENTS

| | | |
|---|---|---|
| JP | 2022-024741 A | 2/2022 |
| JP | 2022-060075 A | 4/2022 |
| JP | 2022-086516 A | 6/2022 |

* cited by examiner

VEHICLE CONTROL APPARATUS, VEHICLE CONTROL METHOD, AND PROGRAM THEREOF

TECHNICAL FIELD

The present disclosure relates to a vehicle control apparatus configured to perform a control to decrease a possibility that a host vehicle comes extremely (excessively) close to a target object that is located/present in an obliquely frontward area (an area diagonal to the front), a vehicle control method thereof, and a program thereof.

BACKGROUND

One of known vehicle control apparatuses (hereinafter, referred to as a "conventional apparatus) is configured to detect a target object that is located/present in a central area that is an area in front of a host vehicle and/or in an area lateral to the central area (i.e., in the area in the vicinity of a left end of the central area and in the vicinity of a right end of the central area), using a frontward camera and front side radar. When the conventional apparatus determines that the detected target object is likely to collide with the host vehicle, it performs an emergency running control to mitigate a damage caused by a collision between the detected target object and the host vehicle.

Generally, a driver of the host vehicle tends to recognize a target object that is located in the central area in front of the host vehicle relatively early. A relative lateral speed of such a target object is typically low. Whereas, the driver tends to recognize a target object that is located in the area lateral to the central area (i.e., the target object that is located to the right side or to the left side to the front of the vehicle) and is about to cross in front of the host vehicle relatively late. A relative lateral speed of such a target object is typically high.

In view of the above, the conventional target object is configured to start the emergency running control earlier when the relative lateral speed of the target object is equal to or higher than a threshold than when the relative lateral speed of the target object is lower than the threshold (refer to Japanese Patent Application Laid-Open No. 2022-60075).

SUMMARY

The target object that is about to (is trying to) cross in front of the vehicle, such as a pedestrian and a bicycle, is in a stopped state (i.e. its speed is zero) when it is detected in the area in front of and lateral to the vehicle at first, however, it may often suddenly start to cross thereafter. In this case, the relative lateral speed of such a target object is lower than the threshold when it is detected at first, the emergency running control is not started early. This may lead to an excessive delay in performing the emergency running control.

The present disclosure is made to cope with the problem described above. That is, one of objectives of the present disclosure is to provide a vehicle control apparatus capable of starting a vehicle control in accordance with a target object at a more appropriate timing (time point), wherein the target object is an object that is located in the area in front of and lateral to the vehicle, and that a driver of a host vehicle tends to recognize relatively late.

In order to cope with the above-described problem, one of embodiments of the present disclosure comprises:

a specific camera device (FSM) capable of obtaining front side target object information including information on a blind angle target object that is an object located in a blind angle detection area (DAA) that is an area lateral to and outside of a target object detection area (FWA) of a frontward monitoring device (20, 30, FWM) that includes a frontward camera (21) that takes a picture of a frontward area in front of a host vehicle and has a first horizontal angle (Of) of view; and a controller (10, 50) configured to control a driving force of the host vehicle (step 670, step 740) in such a manner that the driving force of the host vehicle is smaller when it is determined, based on the front side object information, that a start moving suppression condition is satisfied (step 640 to step 660) than when it is determined that the start moving suppression condition is not satisfied, wherein the start moving suppression condition includes a target object condition (step 640) to be satisfied when a target object is located in a front side obstacle area (e.g., A2, A2 and A3, etc.) corresponding to a kind of the blind angle target object, the target object having a kind that coincides with the kind of the blind angle target object.

According to the above-described embodiment, the driving force of the host vehicle is made smaller when it is determined that the start moving suppression condition is satisfied than when it is determined that the start moving suppression condition is not satisfied. In order for the start moving suppression condition to be satisfied, the target object condition has to be satisfied. That is, the start moving suppression condition includes the target object condition. The target object condition is a condition to be satisfied when a target object is located/present in a front side obstacle area corresponding to (or determined depending on) a kind of a blind angle target object that cannot be detected by the frontward monitoring device. Therefore, the control to suppress the driving force can be carried out at an appropriate timing that corresponds to the kind of the object that is located in the front side area of the host vehicle. In other words, the normal start moving suppression control to cope with the object that is located in the front side area of the host vehicle can be performed at the appropriate timing.

In some embodiments, the controller (10) is configured to:

specify, based on the front side target object information, the kind of the blind angle target object (step 620);

specify, based on the front side target object information, a moving state of the blind angle target object (step 625);

determine, based on the specified kind of the blind angle target object and the specified moving state of the blind angle target object, the front side obstacle area (step 630); and determine that the target object condition is satisfied (step 640), upon determining, based on the front side target object information, that a target object is located in the determined front side obstacle area, wherein the target object has a kind that coincides with the kind corresponding to the front side obstacle area, and has a moving state that coincides with the moving state corresponding to the front side obstacle area.

According to the embodiment described above, the front side obstacle area is determined/specified based not only on the kind of the blind angle target object, but also on the moving state of the blind angle target object. For example, in a case where the object is a pedestrian, a lateral distance with respect to the host vehicle of the front side obstacle area that is determined when the pedestrian is coming close to the host vehicle can be made longer than a lateral distance with respect to the host vehicle of the front side obstacle area that is determined when the pedestrian is not moving (stationary). In this manner, since the front side obstacle area is determined/specified based on both of the kind of the blind angle target object and the moving state of the blind angle target object, the control to suppress the driving force can be carried out at an more appropriate timing in accordance with the kind of the object and the moving state of the object. It should be noted that the kind to be specified includes "a pedestrian, a bicycle, or a vehicle (including an automobile and a motorcycle)" for example. The moving state to be specified includes "a stationary state, a state in which the object is coming closer to the host vehicle, and a state other than these".

In some embodiments, the vehicle control apparatus further comprises:
 a vehicle speed sensor (81) configured to detect a vehicle speed (SPD) that is a speed of the host vehicle;
 an acceleration pedal operation amount sensor (82) configured to detect an acceleration pedal operation amount (AP) of the host vehicle; and
 a power train actuator (51) configured to change the driving force of the host vehicle.

The controller (10) is further configured to:
 in a case where the target object condition is satisfied (step 640), determine that the start moving suppression condition is satisfied (step 670) when it is determined that the detected vehicle speed (SPD) is equal to or lower than a specific vehicle speed threshold (SPDth) (step 650) and the detected acceleration pedal operation amount (AP) is equal to or greater than a specific operation threshold (low-side threshold APLoth) (step 660);
 when it is determined that the start moving suppression condition is not satisfied, control the power train actuator in such a manner that the driving force coincides with a normal driving force that is greater as the detected acceleration pedal operation amount is greater (step 750); and
 when it is determined that the start moving suppression condition is satisfied, control the power train actuator in such a manner that the driving force coincides with a driving force that is smaller than the normal driving force (step 740).

According to the embodiment described above, in a case where the target object condition is satisfied, it is determined that the start moving suppression condition is satisfied when the acceleration pedal is depressed relatively greatly while the vehicle speed is relatively low, so that the power train actuator is controlled in such a manner that the driving force coincides with the driving force that is smaller than the normal driving force. Therefore, when the driver attempts to cause the host vehicle to start moving without recognizing/noticing the blind angle target object, the riving force of the host vehicle is suppressed. This enables the driver to stop the host vehicle quickly when the blind angle target object tries to cross in front of the host vehicle and moves to a position in front of the host vehicle.

In some embodiments,
 the specific camera device (FSM) includes a frontward ultrawide-angle camera (frontward PVM camera 41) having a second horizontal angle (θw) of view that is greater than the first horizontal angle of view (θf), and is configured to obtain the front side target object information based on image data obtained by the frontward ultrawide-angle camera.

The frontward ultrawide-angle camera is often installed/mounted on the host vehicle together with another ultrawide-angle camera(s) in order to produce a bird's-eye view image of the host vehicle. Thus, according to the above-described embodiment, the front side target object information that includes the information on the blind angle target object can be obtained without specially providing an additional camera for the specific camera device.

In some embodiments,
 the controller (10) is configured to:
  determine whether or not a target object is located in a predetermined frontward obstacle area (A1) in front of the host vehicle, using image data obtained by the frontward camera (step 510);
  in a case where it is determined that the target object is located in the frontward obstacle area, determine that an erroneous start moving suppression condition is satisfied (step 540) when the detected vehicle speed (SPD) is equal to or lower than the specific vehicle speed threshold (SPDth) (step 520), and the detected acceleration pedal operation amount (AP) is equal to or greater than an erroneous start moving operation amount threshold (APHith) that is greater than the specific operation threshold (step 530); and
  when it is determined that the erroneous start moving suppression condition is satisfied, control the power train actuator in such a manner that the driving force coincides with a driving force that is smaller than the normal driving force (step 720).

When it is determined that a target object is located in the predetermined frontward obstacle area (A1) in front of the host vehicle, using image data obtained by the frontward camera, the driver generally recognizes/notices the object, and thus, he/she typically does not depress/operates the acceleration pedal greatly. However, there may be a case where he/she erroneously/mistakenly depresses the acceleration pedal in place of the brake pedal. Namely, the driver may perform an erroneous operation on the acceleration pedal. In view of this, the above-described embodiment determines that such an erroneous operation has occurred when the vehicle speed (SPD) is equal to or lower than the specific vehicle speed threshold (SPDth) and the acceleration pedal operation amount (AP) is equal to or greater than the erroneous start moving operation amount threshold (APHith), so as to decrease the driving force. Therefore, a collision with the obstacle that is present in front of the host vehicle can be prevented.

In some embodiments, the frontward obstacle area (A1) is a rectangular area having a longitudinal direction that is frontward in a front rear axis direction (X-axis direction) of the host vehicle, wherein a width of the rectangular area (a length along Y-axis direction) is a value (2·D1) in accordance with a width of the host vehicle.

The control unit is further configured to, when the front side target object information includes information on an intermediate target object that is an target object located between the frontward obstacle area (A1) and the blind angle detection area (DAA) (i.e., the intermediate target object that is an target object located in an area B between the area A1 and each of straight lines Lfr), handle the intermediate target object as the blind angle target object in order to determine whether or not the target object is satisfied.

According to the above-described embodiment, the normal start moving suppression control can be carried out for an object that is located outside of the blind angle detection area DAA and is located in an area lateral to and outside of the frontward obstacle area.

The present disclosure includes (can be applied to) a vehicle control method that the above-described vehicle control apparatus performs and programs thereof.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols.

DETAILED DESCRIPTION

<Configuration>

Figure 1:
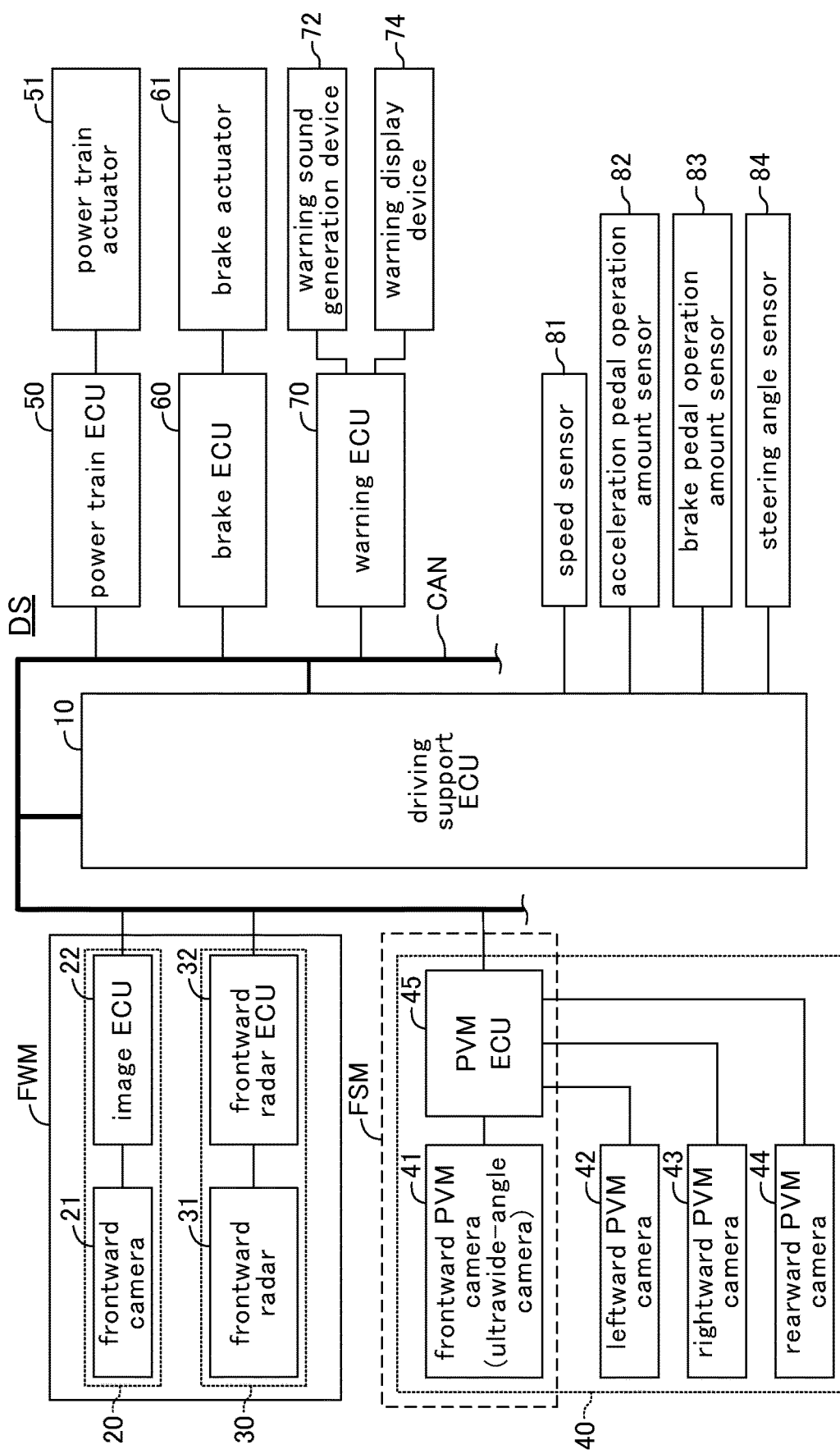
FIG. 1 is a schematic diagram of a vehicle control apparatus according to an embodiment of the present disclosure.
Figure 2:
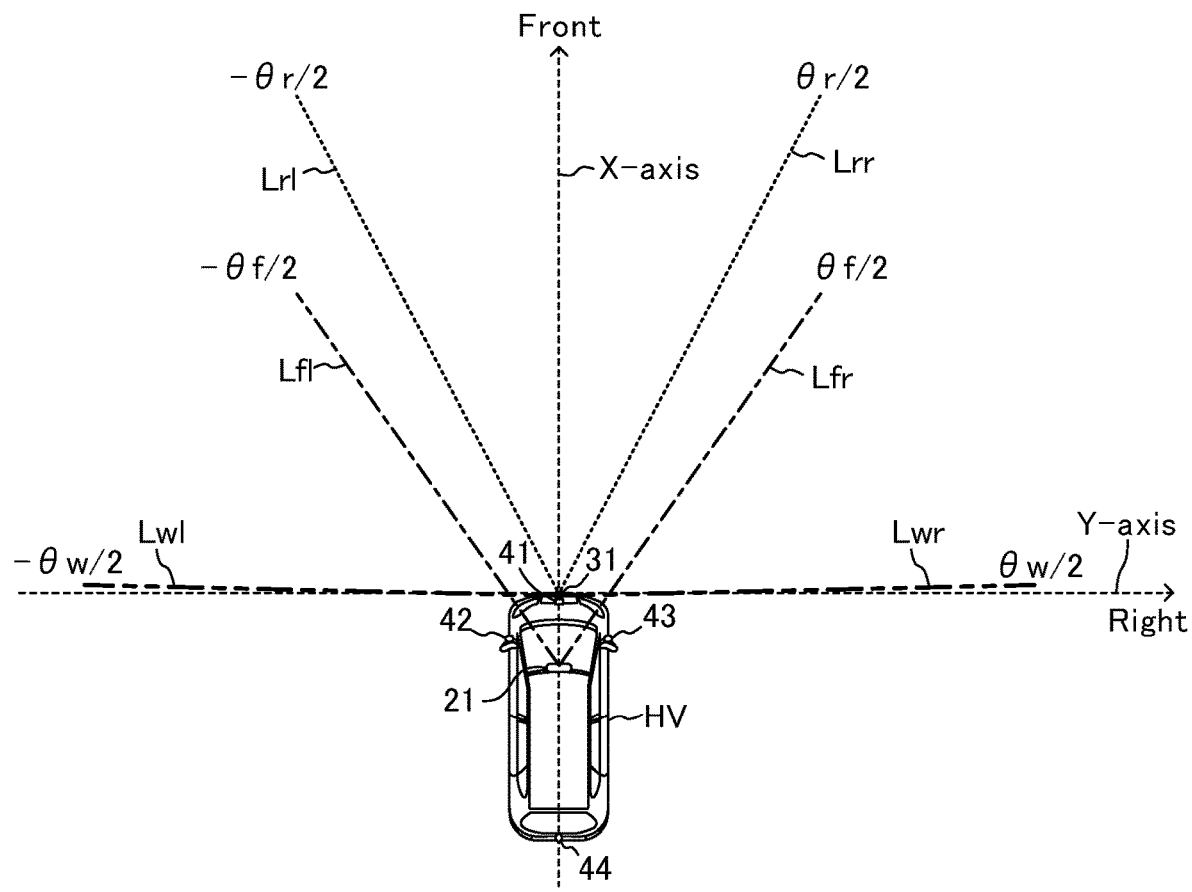
FIG. 2 is a plan view of a host vehicle and a surrounding area of the host vehicle to illustrate an object detection area of each of "a frontward camera, a frontward radar, and a frontward PVM camera" shown in FIG. 1.

A "vehicle control apparatus (or a driving support apparatus) DS according to an embodiment of the present disclosure" shown in FIG. 1 is applied to (or installed in/on) a vehicle HV shown in FIG. 2. Hereinafter, the vehicle in/on which the vehicle control apparatus DS is installed is referred to as a "host vehicle HV" in order to discriminate the vehicle from other vehicles.

As shown in FIG. 1, the vehicle control apparatus DS comprises a driving support ECU 10, a frontward camera device 20, a frontward radar device 30, a PMV camera device 40, a power train ECU 50, a power train actuator 51, a brake ECU 60, a brake actuator 61, a warning ECU 70, a warning sound generation device 72, a warning display device 74, a speed sensor 81, an acceleration pedal operation amount sensor 82, a brake pedal operation amount sensor 83, and a steering angle sensor 84.

In the present specification, an "ECU" is an abbreviation of an "Electronic Control Unit" including as a main component a microcomputer, and is sometimes referred to as a controller or a computer. The microcomputer includes a CPU (processor), a ROM, a RAM, a non-volatile memory, and an interface (I/F). The CPU is configured and/or programmed to realize various functions described later by executing instructions (routines, or programs) stored in the ROM. Some or all of the above-described ECUs and a plurality of ECUs described later may be integrated into a single ECU. The above-described ECUs and the plurality of the ECUs described later are connected with each other so as to be able to mutually exchange data/information through a CAN (Controller Area Network).

Each of the driving support ECU 10 and the ECUs (22, 32, 45) described later processes information on a position of a target object, using an orthogonal coordinate system (X-axis, Y-axis) shown in FIG. 2. The orthogonal coordinate system has been defined as follows.

Origin: a central position in a vehicle width direction of a front end of the host vehicle HV.

X-axis: an axis, extending in a front-rear direction of the host vehicle HV, and passing through the origin. A positive direction of the X-axis is frontward of the host vehicle HV.

Y-axis: an axis, extending in a left-right direction (vehicle width direction) of the host vehicle HV, and passing through the origin. A positive direction of the Y-axis is rightward of the host vehicle HV.

The driving support ECU 10 shown in FIG. 1 is a main ECU of the vehicle control apparatus DS, and performs a driving support/assistance control (vehicle control) as described later.

The frontward camera device 20 includes a frontward camera 21 and an image ECU 22.

As shown in FIG. 2, the frontward camera 21 is disposed/arranged at an upper and central position of a front windshield of the host vehicle HV. The frontward camera 21 is a stereo camera, and obtains image data including a pair of left and right images by taking a picture of a "scene (including a road surface and a target object) in front of the host vehicle HV" every time a predetermined time elapses. A shooting range of the frontward camera 21 is a range having the X-axis as a central axis and an angle θf as a central angle. Namely, a horizontal angle of view (i.e., a first horizontal angle of view) of the frontward camera 21 is the angle θf (in the present example, 100 degrees). Therefore, the frontward camera 21 takes a picture of the scene that is in a range having (between) an angle (θf/2) rightward from the frontward direction of the host vehicle HV and the angle (θf/2) leftward from the frontward direction of the host vehicle HV, and within a shooting possible distance Rf from the frontward camera 21. It should be noted that the frontward camera 21 may be a monocular camera.

The image ECU 22 shown in FIG. 1 analyzes the image data transmitted from the frontward camera 21 to produce a frontward camera target object information every time a predetermined time elapses. The frontward camera target object information includes "a position, a relative longitudinal speed (a relative speed in the X-axis direction), a relative lateral speed (a relative speed in the Y-axis direction), and a kind (type)" of the target object shot (whose picture is taken) by the frontward camera 21.

The frontward radar device 30 constitutes a frontward monitoring device FWM together with the frontward camera device 20. The frontward radar device 30 is a device configured to obtain information on a target object that is present/located in front (ahead) of the host vehicle HV, using electric waves (e.g. radar) within a millimeter-wave band. The frontward radar device 30 includes a frontward radar 31 and a frontward radar ECU 32.

As shown in FIG. 2, the frontward radar 31 is disposed/arranged at a position of the above-described origin, and transmits/radiates the electric waves (radar) in the millimeter-wave band in a detection area that expands (fans out) with a central axis (radar axis) that is on the X-axis. The center angle of the detection area is an angle θr. In other words, the frontward radar 31 transmits the electric waves to a range having (between) an angle (θr/2) rightward from the frontward direction of the host vehicle HV and the angle (θr/2) leftward from the frontward direction of the host vehicle HV. It should be noted that the angle θr is smaller than the angle θf.

When a target object is present/located within the range to which the electric waves are transmitted from the frontward radar 31 (i.e., within the detection area), the electric waves are reflected at (by) the target object so that reflection waves are generated. The frontward radar 31 receives the reflection waves. The frontward radar 31 transmits information on the transmitted electric waves and the received reflection waves to the frontward radar ECU 32, every time a predetermined time elapses.

The frontward radar ECU 32 obtains a target object information on the target object that is present/located within the detection area of the frontward radar 31, based on the information transmitted from the frontward radar 31. The target object information is referred to as "frontward radar target object information", and includes a distance between the target object and the position of the origin, an azimuth (an orientation/direction) of the target object, and a relative speed of the target object. It should be noted that an upper limit distance of the detection area of the frontward radar 31 is longer than the shooting possible distance Rf.

Figure 3:
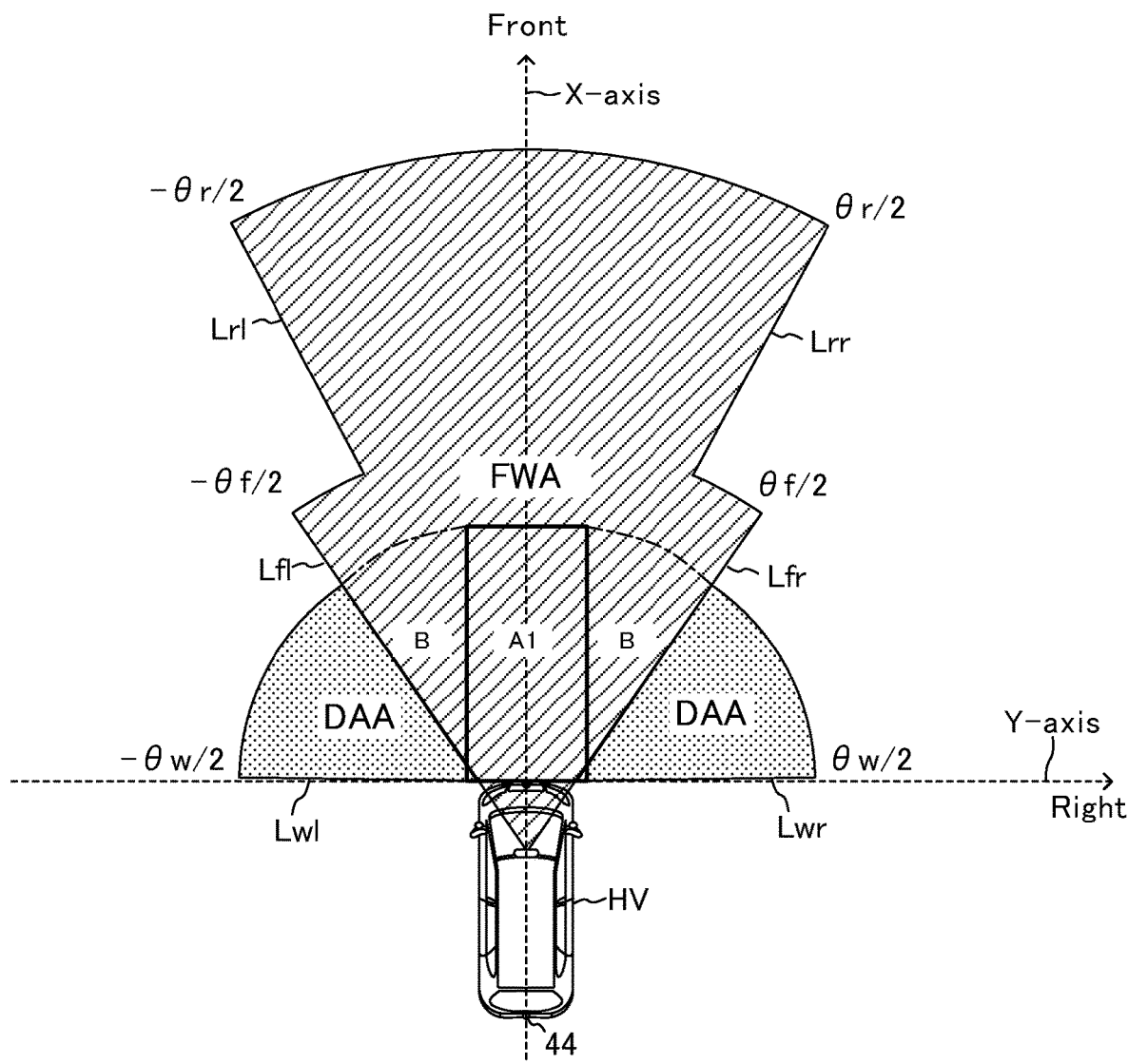
FIG. 3 is a plan view of the host vehicle and the surrounding area of the host vehicle to illustrate "a target object detection area FWA of a frontward monitoring device FWM shown in FIG. 1, and a blind angle detection area DAA that a specific camera device FSM shown in FIG. 1 can detect".

It is clear from the above, a target object detection area FWA of the frontward monitoring device FWM that includes the frontward camera device 20 and the frontward radar device 30 has a shape with hatching lines, as illustrated in FIG. 3.

The driving support ECU 10 produces fusion target object information by fusing the frontward camera target object information with the frontward radar target object information. The fusion target object information includes "a position, a relative longitudinal speed (a relative speed in the X-axis direction), a relative lateral speed (a relative speed in the Y-axis direction), a size (i.e., a width and a length), and a kind (type)" of the target object.

The PMV camera device 40 shown in FIG. 1 comprises a frontward PVM camera 41, a leftward PVM camera 42, a rightward PVM camera 43, a rearward PVM camera 44, and a PVM•ECU 45.

As shown in FIG. 2, the frontward PVM camera 41 is disposed/arranged at the position of the origin, and comprises an unillustrated fisheye lens (ultrawide-angle lens). The frontward PVM camera 41 obtains image data by taking a picture of (shooting) a "scene (including a road surface and an target object) of/in an area in front (ahead) of the host vehicle HV and obliquely frontward areas of the host vehicle HV" every time a predetermined time elapses. The shooting range of the frontward PVM camera 41 is a range having the X-axis as a central line and having an angle θw as a central angle. Namely, a horizontal angle of view (i.e., a second horizontal angle of view) of the frontward PVM camera 41 is the angle θw (in the present example, 180 degrees) that is greater than the horizontal angle of view (angle θf) of the frontward camera 21. Therefore, the frontward PVM camera 41 takes a picture of the scene that is in a range having (between) an angle (θw/2) rightward from the frontward direction of the host vehicle HV and the angle (θw/2) leftward from the frontward direction of the host vehicle HV, and within a "shooting possible distance Rw that is shorter than the shooting possible distance Rf". The frontward PVM camera 41 is also called an ultrawide-angle camera.

Each of the leftward PVM camera 42, the rightward PVM camera 43, and the rearward PVM camera 44 has the same structure as the frontward PVM camera 41.

As shown in FIG. 2, the leftward PVM camera 42 is disposed/arranged on a left side surface of the host vehicle HV, and takes a picture of (shoots) a scene in a left side area of the host vehicle HV.

The rightward PVM camera 43 is disposed/arranged on a right side surface of the host vehicle HV, and takes a picture of (shoots) a scene in a right side area of the host vehicle HV.

The rearward PVM camera 44 is disposed/arranged at a central position in the vehicle width direction of a rear end of the host vehicle HV, and takes a picture of (shoots) a scene in a backward area of the host vehicle HV.

The PVM•ECU 45 produces image data of a bird's-eye view and image data of a traveling direction view, based on image data transmitted from the frontward PVM camera 41, the leftward PVM camera 42, the rightward PVM camera 43, and the rearward PVM camera 44, every time a predetermined time elapses. The image data of the bird's-eye view and the image data of the traveling direction view are transmitted to the driving support ECU 10 and an unillustrated display ECU, every time a predetermined time elapses. The display ECU displays, on an unillustrated display, a bird's-eye view based on the image data of the bird's-eye view and a traveling direction view based on the image data of the traveling direction view. The traveling direction view includes a moving frontward direction image and a moving rearward direction image. It should be noted that a structure of each of the PVM cameras 41-44, the bird's-eye view, and the traveling direction view are well-known in the art (refer to, for example, Japanese Patent Application Laid-Open No. 2022-86516, Japanese Patent Application Laid-Open No. 2020-117128, and Japanese Patent Application Laid-Open No. 2019-016825).

In addition, the PVM•ECU 45 analyses the image data transmitted from the frontward PVM camera 41 every time a predetermined time elapses so as to produce PVM camera object information (front side target object information). The PVM camera object information includes a position of the target object and a kind/type of the target object.

In this manner, the PVM camera 41 and the PVM•ECU 45 constitute a specific camera device FSM capable of obtaining front side target object information. In addition, as shown in FIG. 3, the specific camera device FSM is also capable of obtaining information on a target object (hereinafter, referred to as a "blind angle target object") in a "blind angle detection area DAA". The blind angle detection area DAA is an area located at the side of and the outside of the target object detection area FWA of the frontward monitoring device FWM. Namely, the specific camera device FSM is configured to be able to obtain information on an object that is located/present in "any one of the blind angle detection area DAA, a frontward obstacle area A1, and an in-between area B (area between the area A1 and each of straight lines Lfr)" shown in FIG. 3.

The power train ECU 50 is connected with the power train actuator 51. The power train actuator 51 is an actuator for changing a driving state of a driving device of the host vehicle HV. The driving device is a driving source of the host vehicle HV, and in the present example, an internal combustion engine that is a gasoline fuel-injection, spark ignition, multi-cylinder engine including a throttle vale to adjust an intake air amount. The power train actuator 51 includes at least a throttle valve actuator for changing an opening degree of the throttle valve.

The power train ECU 50 drives the power train actuator 51 so as to change a torque generated by the driving device. The torque generated by the driving device is transmitted to unillustrated diving wheels through an unillustrated gear mechanisms. Accordingly, the power train ECU 50 controls the driving device through the power train actuator 51 so as to be able to control a driving force of the host vehicle HV.

It should be noted that the driving device of the host vehicle HV may be an electric motor. In other words, the host vehicle HV may be a Battery Electric Vehicle, and thus, the power train actuator 51 may be an invertor that is capable of changing a torque of the electric motor. In addition, the driving device of the host vehicle HV may include the internal combustion engine and the electric motor. In other words, the host vehicle HV may be a Hybrid Electric Vehicle, and thus, the power train actuator 51 may includes the invertor that is capable of changing the torque of the electric motor and the throttle valve actuator of the internal combustion engine.

The brake ECU 60 is connected with the brake actuator 61. The brake actuator 61 is an actuator for changing a brake force (frictional braking force) applied to the host vehicle HV by controlling a brake device disposed in each of the wheels of the host vehicle HV. Thus, the brake ECU 60 can control the brake force applied to the host vehicle HV by controlling the brake device through the brake actuator 61.

The warning ECU 70 is connected with the warning sound generation device 72, and can causes the warning sound generation device 72 to generate a warning sound.

The warning ECU 70 is connected with the warning display device 74, and can causes the warning display device 74 to display various warnings.

The driving support ECU 10 is connected with the following sensors so as to input output values (detection values) of the sensors.

The vehicle speed sensor 81 configured to detect a speed (i.e., vehicle speed SPD) of the host vehicle HV.

The acceleration pedal operation amount sensor 82 configured to detect an operation amount AP of an unillustrated acceleration pedal of the host vehicle HV.

The brake pedal operation amount sensor 83 configured to detect an operation amount BP of an unillustrated brake pedal of the host vehicle HV.

The steering angle sensor 84 configured to detect a steering (steered) angle of the host vehicle HV.

The driving support ECU 10 is connected with other driving state sensors configured to detect parameters indicative of a driving state of the host vehicle HV. The driving state sensors include, for example, a wheel rotational speed sensor of each of the wheels, a brake switch that generates an "ON signal" when the brake pedal is operated/depressed. In addition, each of the sensors may be connected to an ECU other than the driving support ECU 10. In such a case, the driving support ECU 10 may input an output value of an sensor that is connected to the ECU other than the driving support ECU 10 from the ECU other than the driving support ECU via the CAN.

(Outline of Operations)

The driving support ECU 10 of the vehicle control apparatus DS is configured to perform an erroneous start moving suppression control for the frontward obstacle and a normal start moving suppression control for the front side (obliquely frontward) obstacle. The normal start moving suppression control for the front side obstacle is referred to as a "specific control" or a "front side obstacle start moving suppression control". It should be noted that the driving support ECU 10 may simply be referred to as an "ECU 10", hereinafter.

<Erroneous Start Moving Suppression Control for Frontward Obstacle>

Figure 4:
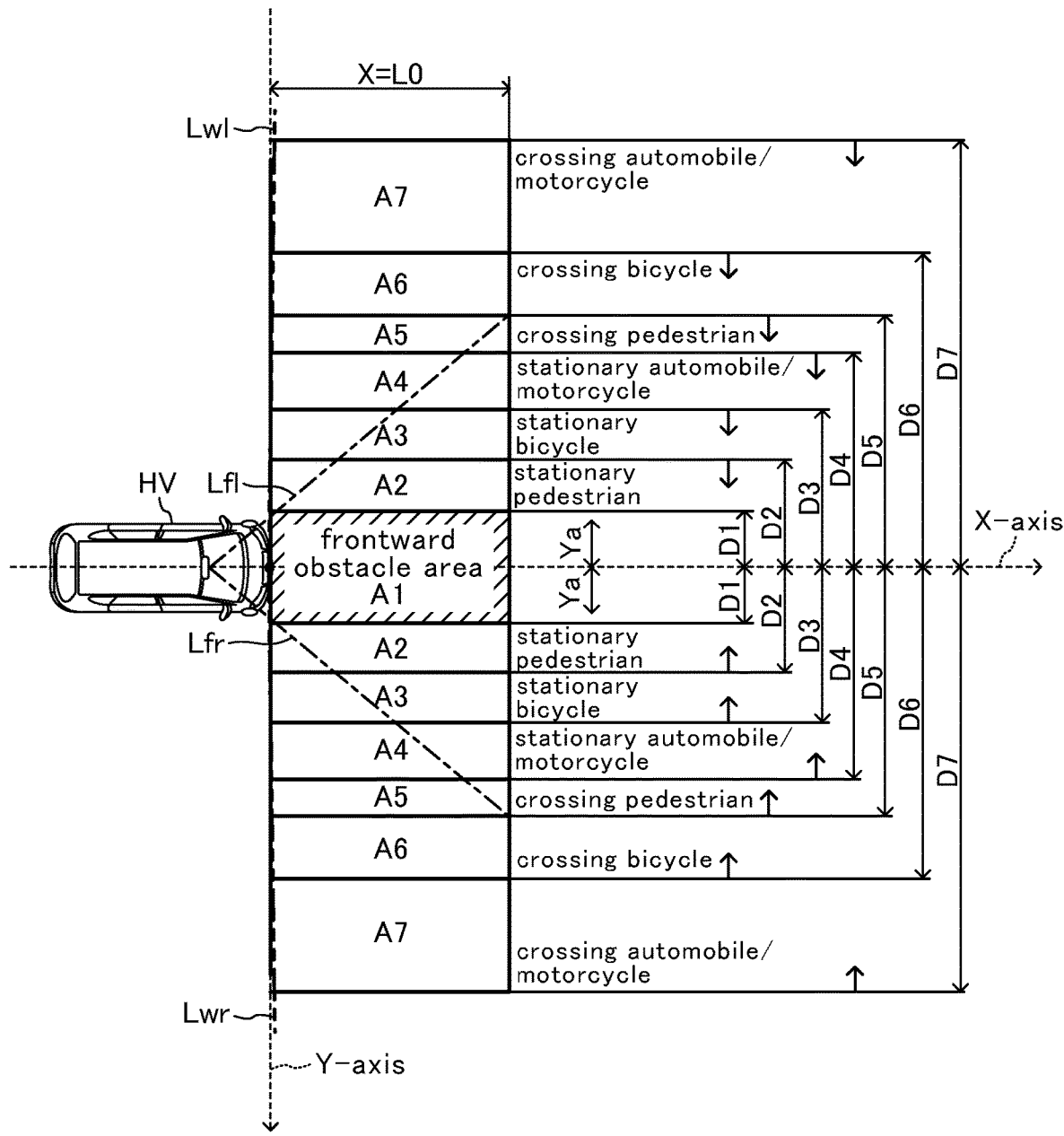
FIG. 4 is a plan view of the host vehicle and the surrounding area of the host vehicle to illustrate "a frontward obstacle area and a front side monitoring area".

The ECU 10 determines whether or not an object is present/located in the frontward obstacle area A1 shown in FIG. 4, based on (using) the fusion target object information (that is obtained/produced by fusing the frontward camera target object information with the frontward radar target object information). The frontward obstacle area A1 is an area that is substantially rectangular provided/set in front of (in the forward moving direction of/ahead of) the host vehicle HV. A length range in the X-axis direction of the frontward obstacle area A1 is from the front end of the host vehicle HV (i.e., a distance zero from the front end) to a distance L0 that is shorter than the shooting possible distance Rf of the frontward camera 21. A range of a length in the Y-axis positive direction or in the Y-axis negative direction of the frontward obstacle area A1 is from zero to a distance D1. Namely, the length (Ya, or width Ya) of the frontward obstacle area A1 in the Y-axis direction of the frontward obstacle area A1 is "2·D1". The distance D1 has been set to/at a value that is slightly longer than a half of the vehicle width WD of the host vehicle HV (i.e., D1=(WD/2+predetermined value α).

When the ECU 10 determines, based on (using) the fusion target object information, that a frontward obstacle condition is satisfied that is a condition to be satisfied when an object is present/located in the frontward obstacle area A1, the ECU 10 determines whether or not a condition (i.e., erroneous start moving determination condition) is satisfied. The erroneous start moving determination condition is a condition to be satisfied when it can be inferred that a driver of the host vehicle HV has made an erroneous operation (or, an erroneous start moving operation) to cause the host vehicle HV to start moving. More specifically, the erroneous start moving determination condition is the condition to be satisfied when both of a condition C1 below and a condition C2 below are satisfied.

(Condition C1) to be satisfied when the vehicle speed SPD is equal to or lower than a vehicle speed threshold SPDth.

(Condition C2) to be satisfied when the acceleration pedal operation amount AP is equal to or greater than a high-side threshold (first threshold) APHith. The high-side threshold APHith may be referred to as an "erroneous start moving operation amount threshold".

When the ECU 10 determines that the frontward obstacle condition is satisfied and the erroneous start moving determination condition is satisfied, the ECU 10 determines that an erroneous start moving suppression condition is satisfied and performs the erroneous start moving suppression control for the frontward obstacle. The erroneous start moving suppression control includes the following controls.

A control to keep the driving force of the host vehicle HV at a driving force (that may sometimes be referred to as a "creeping running driving force") that causes the host vehicle to creep. For example, the ECU 10 sets the opening degree of the throttle valve to zero, to keep the driving force of the host vehicle HV at the creeping running driving force.

A control to adjust/control the brake force applied to the host vehicle HV in such a manner that a magnitude of a deceleration of the host vehicle HV is equal to (collides with) an allowable maximum deceleration until the vehicle speed SPD becomes lower than a creep vehicle speed SPDcth, when the vehicle speed SPD is higher than a "rapid deceleration required speed SPDBth that is lower than the vehicle speed threshold SPDth". Namely, the ECU 10 performs a rapid deceleration control by setting the brake force to an allowable maximum brake force. The creep vehicle speed SPDcth is lower than the rapid deceleration required speed SPDBth.

<Front Side Obstacle Start Moving Suppression Control (Specific Control) for Front Side Obstacle>

There may be a case where a target object that is located in the area lateral to and outside of the frontward obstacle area A1 (i.e., a target object present in areas in the positive Y-axis direction and the negative Y-axis direction with respect to the frontward obstacle area A1) is about/trying to cross immediately in front of the host vehicle HV. The above-described erroneous start moving suppression control may not be quick enough to take an appropriate action against/for such a target object. In view of this, the ECU 10 is configured to perform the specific control described below.

The ECU 10 determines whether or not a target object is located/present in a front side monitoring area that is outside (lateral to) the frontward obstacle area A1, based on the PVM camera target object information (front side target object information).

When the ECU 10 determines that the target object is present/located in the front side monitoring area, the ECU 10 specifies a kind (type) of the target object, based on the PVM camera target object information. One of well-known methods (e.g., a pattern matching method) is employed for specifying the kind of the target object. In the present example, the specified kind of the target object may include a pedestrian, a bicycle, and a vehicle. The vehicle may include an automobile (a passenger car, a truck, a buss, and the like) and a two-wheel vehicle (motorcycle). It should be noted that, in addition to the pedestrian, the bicycle, and the vehicle, the specified kind of the target object may include a personal mobility such as an electric scooter, and a Segway (registered trademark). In this case, the kind of the target object may be specified based on a normal moving speed of each target object.

In addition, the ECU 10 determines a moving state of the target object based on both of the latest/current PVM camera object information and the PVM camera object information predetermined time before. The moving state that is determined here is one of the followings.

Whether or not the target object is stationary (i.e., is not moving).

Whether or not the target object is coming close to (or approaching) the host vehicle HV (more accurately, whether or not the target object is coming close to the X-axis).

Whether or not the target object is moving away from the host vehicle HV.

Subsequently, as shown in FIG. 4, the ECU 10 determines a front side obstacle area, in response to (in accordance with) the kind of the target object and the moving state of the target object.

A length range in the X-axis direction of the front side obstacle area is from the front end of the host vehicle HV (i.e., a distance zero from the front end) to a shooting possible distance in the X-axis direction of the frontward PVM camera 41. It should be noted that, in FIG. 4, the length range in the X-axis direction of the front side obstacle area is illustrated as a range from the front end of the host vehicle HV to the distance L0, for convenience sake.

A range of a length (Ya) in the Y-axis positive direction or in the Y-axis negative direction of the front side obstacle area is as follows.

For the stationary pedestrian that is not moving: a range from D1 to D2.

For the stationary bicycle that is not moving: a range from D1 to D3.

For the stationary vehicle that is not moving: a range from D1 to D4.

For the crossing pedestrian that is approaching: a range from D1 to D5.

For the crossing bicycle that is approaching: a range from D1 to D6.

For the crossing vehicle that is approaching: a range from D1 to D7.

Here, the next inequality expression is satisfied.

0<D1<D2<D3<D4<D5<D6<D7

In other words, the front side monitoring area is as follows, as shown in FIG. 4.

For the stationary pedestrian: an Area A2.

For the stationary bicycle: Areas A2, and A3.

For the stationary vehicle: Areas A2, A3, and A4.

For the crossing pedestrian: Areas A2, A3, A4, and A5.

For the crossing bicycle: Areas A2, A3, A4, A5 and A6.

For the crossing vehicle: Areas A2, A3, A4, A5, A6, and A7.

The ECU 10 determines, based on the PVM camera information, whether or not a target object is present/located in the above-described determined front side monitoring area, the target object having the kind and the moving state that correspond to the determined front side monitoring area. Hereinafter, the "target object that is present in the determined front side monitoring area and that has "the kind and the moving state" that correspond to the determined front side monitoring area" is referred to as a "corresponding front side obstacle".

When the ECU 10 determines that a front side obstacle condition that is a condition regarding a target object to be satisfied when the corresponding front side obstacle is present, the ECU 10 determines whether or not a start moving determination condition is satisfied. The start moving determination condition is a condition to be satisfied when it can be inferred that the driver of the host vehicle HV has made the start operation to cause the vehicle to start moving. More specifically, the start moving determination condition is satisfied, when both of the following conditions E1 and E2 are satisfied.

(Condition E1) to be satisfied when the vehicle speed SPD is equal to or lower than a vehicle speed threshold SPDth. The vehicle speed threshold SPDth used in the condition E1 is referred to as a specific vehicle speed threshold, and may be the same as or different from the vehicle speed threshold used in the condition C1.

(Condition E2) to be satisfied when the acceleration pedal operation amount AP is equal to or greater than a low-side threshold (second threshold) APLoth. The low-side threshold APLoth is smaller than the high-side threshold APHith (erroneous start moving operation amount threshold), and is referred to as a "specific operation amount threshold".

When the ECU 10 determines that the front side obstacle condition is satisfied and the start moving determination condition is satisfied, the ECU 10 determines that a start moving suppression condition is satisfied and performs the normal start moving suppression control for the corresponding front side obstacle. The normal start moving suppression control includes the following controls.

A control to keep the driving force of the host vehicle HV at the creeping running driving force. For example, the ECU 10 sets the opening degree of the throttle valve to zero.

A control to adjust/control the brake force applied to the host vehicle HV in such a manner that the magnitude of the deceleration of the host vehicle HV is equal to (collides with) a warning deceleration until the vehicle speed SPD becomes lower than a creep vehicle speed SPDcth, when the vehicle speed SPD is higher than a "mild brake required vehicle speed SPDKth that is lower than the rapid deceleration required speed SPDBth". A magnitude of the warning deceleration is smaller than a magnitude of the allowable maximum deceleration. Namely, the ECU 10 performs a mild deceleration control by setting the brake force to a warning brake force.

In this manner, the vehicle control apparatus DS performs not only the erroneous start moving suppression control for the frontward obstacle, but also the normal start moving suppression control (specific control) for the front side obstacle that is detected using the frontward PVM camera 41. Therefore, even when a situation where the front side obstacle is crossing right/immediately in front of the host vehicle HV occurs, the vehicle control apparatus DS can decrease a possibility that the front side obstacle extremely comes close to the host vehicle HV, since the host vehicle HV starts moving slowly/mildly.

(Specific Operation)

The CPU of the driving support ECU 10 (hereinafter, simply referred to as the CPU) is configured or programmed to execute each of routines shown by flowcharts in FIGS. 5-8 every time a predetermined time elapses.

<Setting of Erroneous Start Moving Suppression Control Flag for Frontward Obstacle>

Figure 5:
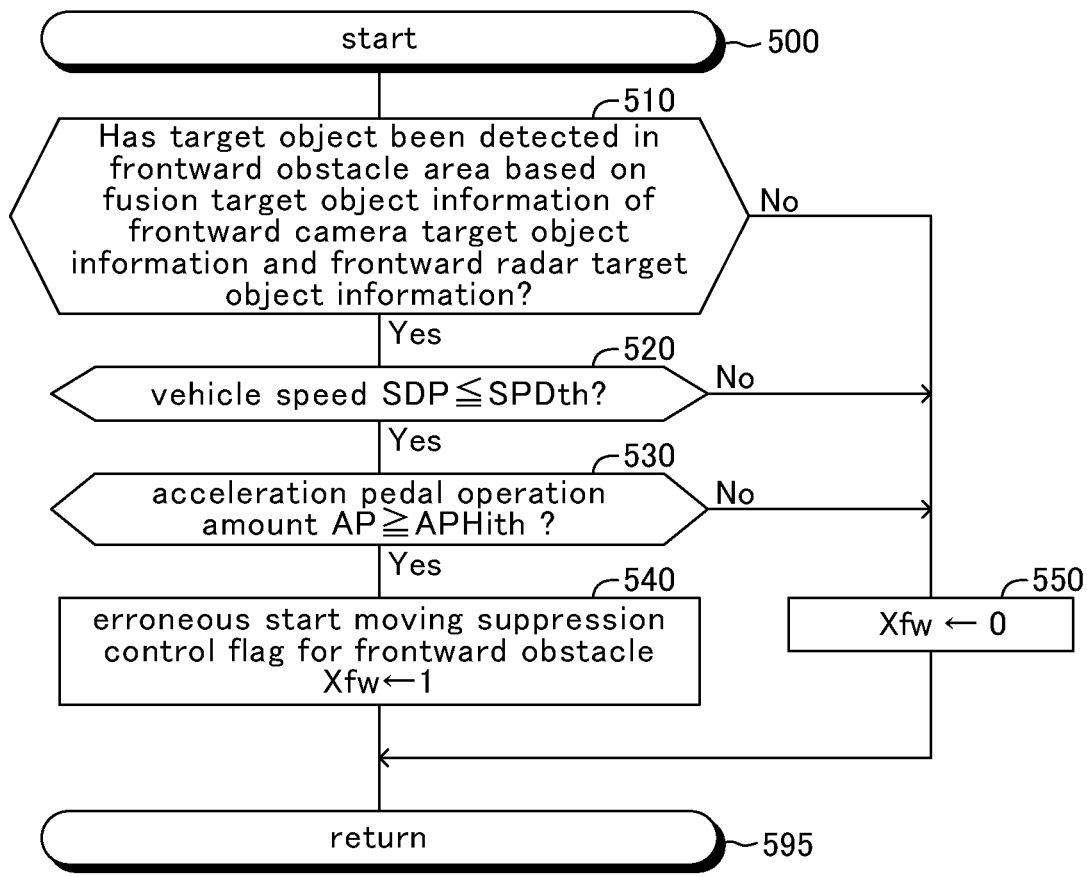
FIG. 5 is a flowchart illustrating a routine executed by a CPU of a driving support ECU shown in FIG. 1.

When an appropriate time point comes, the CPU starts processing from step 500 in FIG. 5, and proceeds to step 510. At step 510, the CPU determines whether or not a target object has been detected in the frontward obstacle area A1 based on the fusion target object information. In other words, the CPU determines whether or not the frontward obstacle condition is satisfied.

When a target object has been detected in the frontward obstacle area A1, the CPU makes a "Yes" determination at step 510, and proceeds to step 520. At step 520, the CPU determines whether or not the vehicle speed SPD is equal to or lower than the vehicle speed threshold SPDth. Namely, the CPU determines whether or not the condition C1 is satisfied. When the vehicle speed SPD is equal to or lower than the vehicle speed threshold SPDth, the CPU makes a "Yes" determination at step 520, and proceeds to step 530. At step 530, the CPU determines whether or not the acceleration pedal operation amount AP is equal to or greater than the high-side threshold APHith. Namely, the CPU determines whether or not the condition C2 is satisfied. For example, the high-side threshold has been set at a "value that is 90% of maximum value of the acceleration pedal operation amount AP".

When the acceleration pedal operation amount AP is equal to or greater than the high-side threshold APHith, the CPU makes a "Yes" determination at step 530, and proceeds to step 540. At step 540, the CPU sets a value of the erroneous start moving suppression control flag Xfw for the frontward obstacle to "1". Thereafter, the CPU proceeds to step 595 to terminate the present routine tentatively.

It should be noted that all of flags including the erroneous start moving suppression control flag Xfw are set to "0" through an unillustrated initialization routine executed by the CPU when a position of an unillustrated ignition key switch of the host vehicle HV is changed from an off position to an on position.

Whereas, in one of cases 1 to 3 described below, the CPU proceeds to step 550 so as to set the value of the erroneous start moving suppression control flag Xfw to "0", and proceeds to step 595 to terminate the present routine tentatively.

Case 1: a case where a target object has not been detected in the frontward obstacle area A1 (step 510: No).

Case 2: a case where the vehicle speed SPD is higher than the vehicle speed threshold SPDth (step 520: No).

Case 3: a case where the acceleration pedal operation amount AP is smaller than the high-side threshold APHith (step 530: No).

<Setting of Normal Start Moving Suppression Control Flag for Front Side Obstacle>

Figure 6:
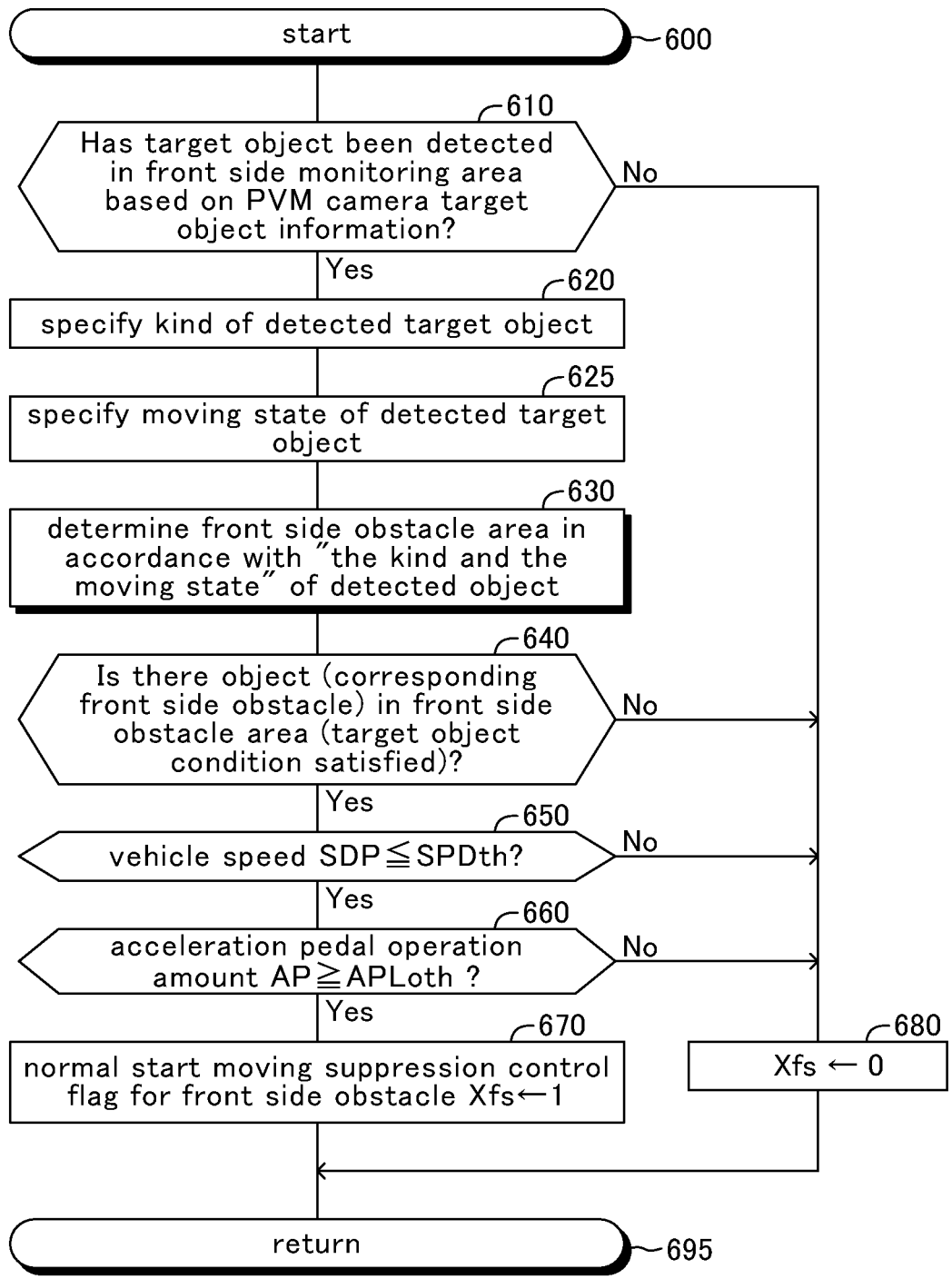
FIG. 6 is a flowchart illustrating a routine executed by the CPU of the driving support ECU shown in FIG. 1.

When an appropriate time point comes, the CPU starts processing from step 600 in FIG. 6, and proceeds to step 610. At step 610, the CPU determines whether or not a target object has been detected (is present/located) in the front side monitoring area including areas A2-A7, based on the PVM camera target object information. In other words, the CPU determines whether or not the PVM camera target object information includes information on a target object that is located in the areas other than the frontward obstacle area A1.

When it is determined that a target object is present/located in the front side monitoring area, the CPU makes a "Yes" determination at step 610, sequentially executes "processes of step 620 to step 630" described below, and proceeds to step 640.

Step 620: the CPU specify a kind of the detected target object. Namely, the CPU determines which one "the object that has been determined to be present/located in the front side monitoring area based on the PVM camera target object information" is, a pedestrian, a bicycle, a vehicle, or an object other than these.

Step 625: the CPU specify a moving state of that detected target object. Namely, the CPU determines which one of moving states "the object whose kind is specified at step 620" is in, being stationary, approaching (coming close to) the host vehicle (more accurately, the X-axis), and moving away from the host vehicle VH.

Step 630: the CPU executes a sub routine shown in FIG. 8 described later in detail so as to determine/select the front side obstacle area in accordance with (corresponding to) "the kind and the moving state" of that detected object.

Subsequently, the CPU proceeds to step 640. At step 640, the CPU determines whether or not there is the object whose kind and moving state correspond respectively to those of the front side obstacle area that is determined at step 630, based on the PVM camera target object information. Namely, the CPU determines whether or not the corresponding front side obstacle is present/located.

When the corresponding front side obstacle is present, the CPU makes a "Yes" determination at step 640, and proceeds to step 650. At step 650, the CPU determines whether or not the vehicle speed SPD is equal to or lower than the speed threshold SPDth. Namely, the CPU determines whether or not the condition E1 is satisfied. When the vehicle speed SPD is equal to or lower than the speed threshold SPDth, the CPU makes a "Yes" determination at step 650, and proceeds to step 660.

At step 660, the CPU determines whether or not the acceleration pedal operation amount AP is equal to or greater than the low-side threshold APLoth. Namely, the CPU determines whether or not the condition E2 is satisfied. For example, the low-side threshold APLoth has been set at a "value that is 50% of the maximum value of the acceleration pedal operation amount AP".

When the acceleration pedal operation amount AP is equal to or greater than the low-side threshold APLoth, the CPU makes a "Yes" determination at step 660, and proceeds to step 670. At step 670, the CPU sets a value of a normal start moving suppression control flag Xfs for the front side obstacle. Thereafter, the CPU proceeds to step 695 to terminate the present routine tentatively.

Whereas, in one of cases 4 to 7 described below, the CPU proceeds to step 680 so as to set the value of the normal start moving suppression control flag Xfs to "0", and proceeds to step 695 to terminate the present routine tentatively.

Case 4: a case where the target object is not present in the front side monitoring area (step 610: No).
Case 5: a case where the corresponding front side obstacle is not present (step 640: No).
Case 6: a case where the vehicle speed SPD is higher than the vehicle speed threshold SPDth (step 650: No).
Case 7: a case where the acceleration pedal operation amount AP is smaller than the low-side threshold APLoth (step 660: No).

<Vehicle Traveling/Running Control>

Figure 7:
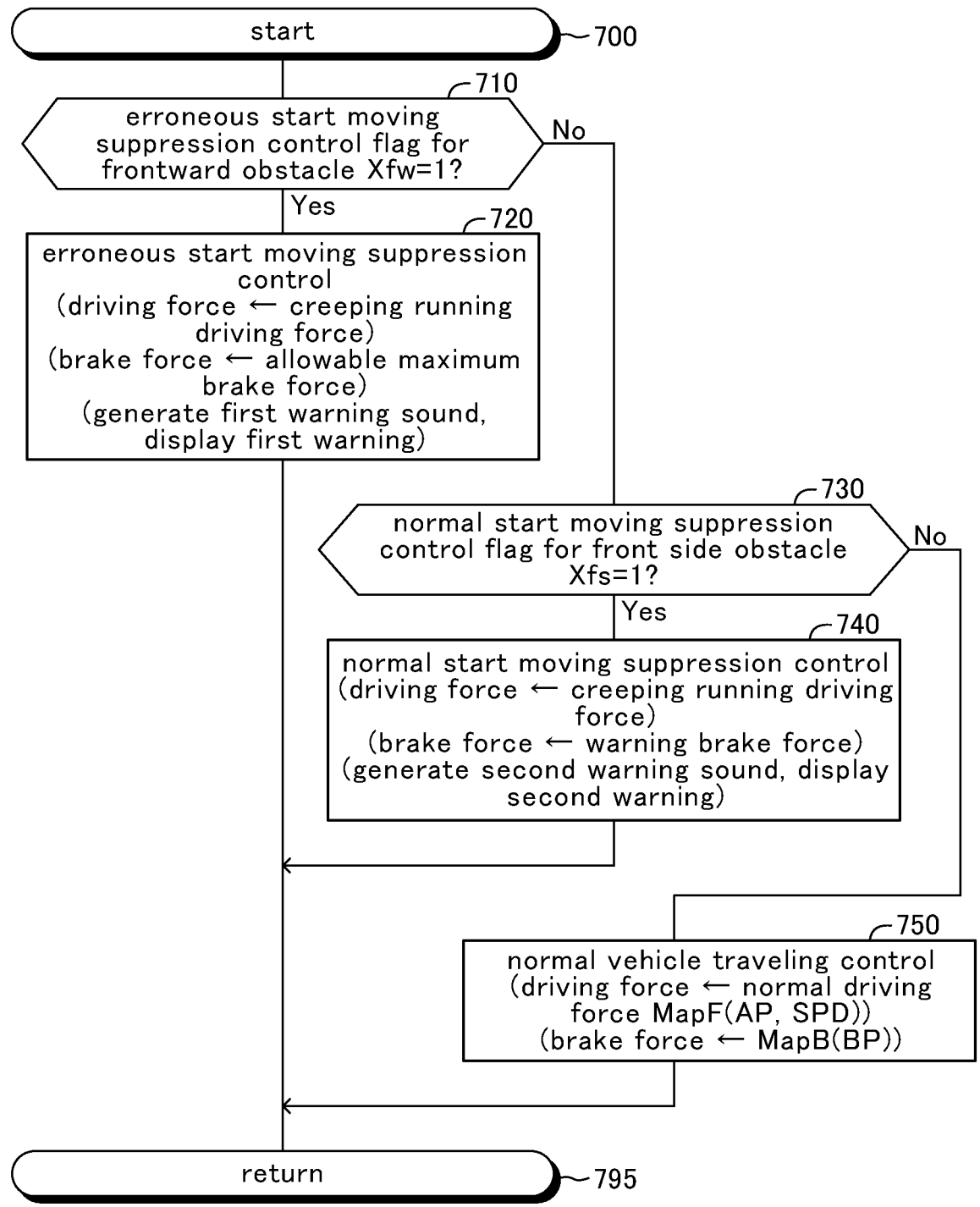
FIG. 7 is a flowchart illustrating a routine executed by the CPU of the driving support ECU shown in FIG. 1.

When an appropriate time point comes, the CPU starts processing from step 700 in FIG. 7, and proceeds to step 710. At step 710, the CPU determines whether or not the value of the erroneous start moving suppression control flag Xfw for the frontward obstacle is "1".

When the value of the erroneous start moving suppression control flag Xfw is "1", the CPU makes a "Yes" determination at step 710, and proceeds to step 720. At step 720, the CPU performs the above-described erroneous start moving suppression control. At step 720, if brake force (operation brake force) that is determined by applying the brake pedal operation amount BP to a look-up table MapB described later is greater than a brake force determined by the erroneous start moving suppression control, the CPU controls the brake actuator 61 in such a manner that an actual brake force is equal to (coincides with) the operation brake force. Thereafter, the CPU proceeds to step 795 to terminate the present routine tentatively.

Whereas, when the value of the erroneous start moving suppression control flag Xfw is "0", the CPU makes a "No" determination at step 710, and proceeds to step 730. At step 730, the CPU determines whether or not the value of the normal start moving suppression control flag Xfs for the front side obstacle is "1".

When the value of the normal start moving suppression control flag Xfs is "1", the CPU makes a "Yes" determination at step 730, and proceeds to step 740. At step 740, the CPU performs the above-described normal start moving suppression control. At step 740, if the operation brake force that is determined based on the the brake pedal operation amount BP and the look-up table MapB described later is greater than a brake force determined by the normal start moving suppression control, the CPU controls the brake actuator 61 in such a manner that the actual brake force is equal to (coincides with) the operation brake force. Thereafter, the CPU proceeds to step 795 to terminate the present routine tentatively.

Whereas, when the value of the normal start moving suppression control flag Xfs is "0", the CPU makes a "No" determination at step 730, and proceeds to step 750. At step 750, the CPU performs a normal vehicle traveling control. More specifically, the CPU determines a target value (i.e., a normal driving force) of the driving force by applying "the acceleration pedal operation amount AP and the vehicle speed SPD" to a look-up table MapF, and controls the power train actuator 51 in such a manner that an actual driving force is equal to (coincides with) the target value of the driving force. According to the table MapF, the target value of the driving force is greater, as the acceleration pedal operation amount AP is greater. In addition, according to the table MapF, when the acceleration pedal operation amount AP is a given value, the target value of the driving force is greater, as the vehicle speed SPD is lower. Furthermore, the CPU determines the operation brake force that is the target value of the brake force by applying the brake pedal operation amount BP to the look-up table MapB, and controls the brake actuator 61 in such a manner that the actual brake force is equal to (coincides with) the operation brake force. According to the table MapB, the operation brake force is greater, as the brake pedal operation amount BP is greater. Thereafter, the CPU proceeds to step 795 to terminate the present routine tentatively.

<Determination of Front Side Obstacle Area>

Figure 8:
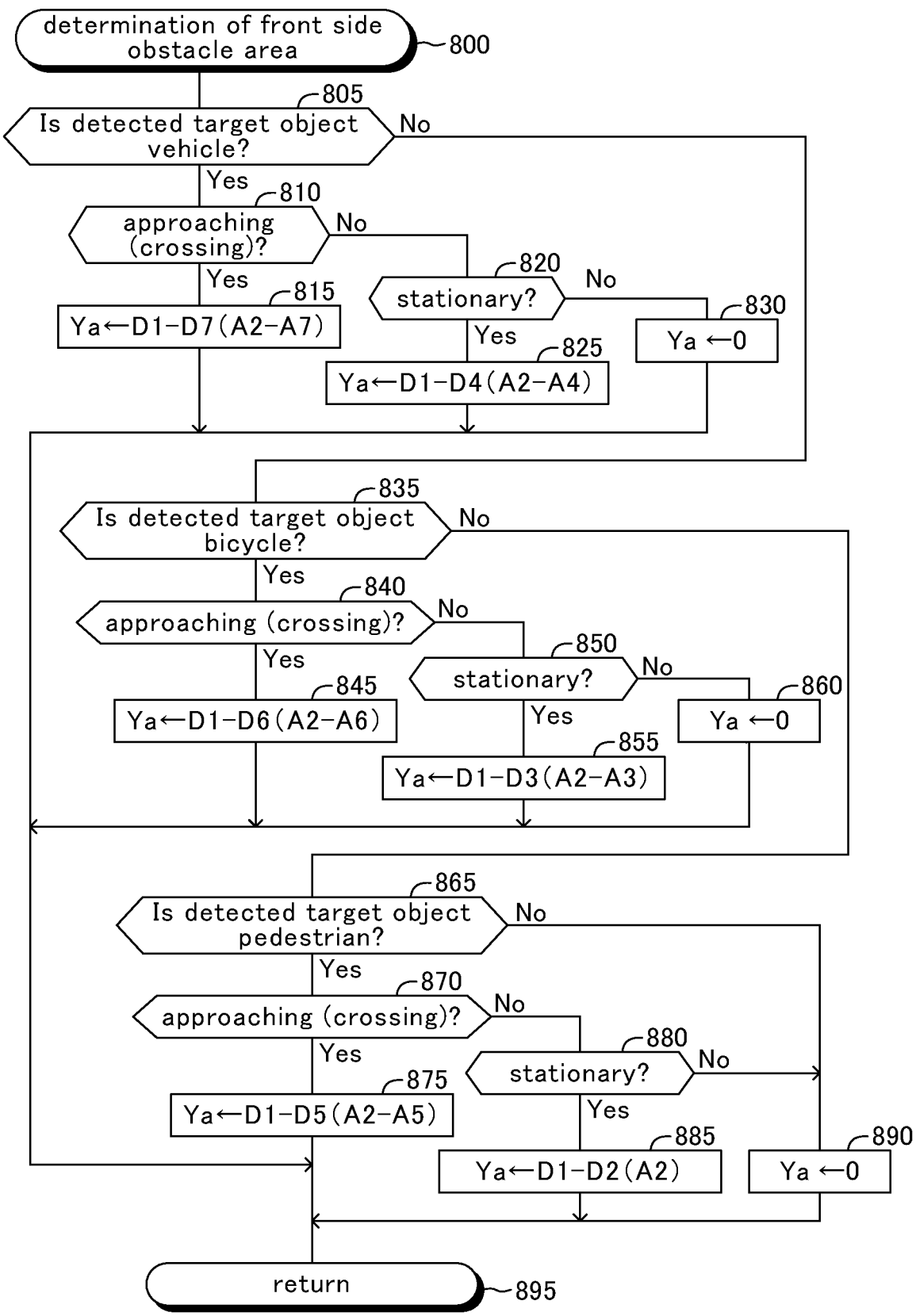
FIG. 8 is a flowchart illustrating a routine executed by the CPU of the driving support ECU shown in FIG. 1.

As described above, when the CPU proceeds to step 630 shown in FIG. 6, the CPU starts processing from step 800 shown in FIG. 8, and proceeds to step 805.

At step 805, the CPU determines whether or not the kind of the object that has been detected based on the PVM camera object information is a vehicle (an automobile or a motorcycle). When the kind of the object that has been detected based on the PVM camera object information is the vehicle, the CPU proceeds to step 810. At step 810, the CPU determines whether or not the vehicle is coming close to the host vehicle HV, based on the PVM camera object information. When the vehicle is coming close to the host vehicle HV, the CPU proceeds to step 815. At step 815, the CPU sets the range of the length (Ya) in the Y-axis positive direction and the Y-axis negative direction of the front side obstacle area to a range from D1 to D7 (i.e., the front side obstacle area is set to include the areas A2 to A7). Thereafter, the CPU proceeds to step 640 shown in FIG. 6 via step 895.

When the vehicle is not coming close to the host vehicle HV, the CPU proceeds to step 820 from step 810. At step 820, the CPU determines whether or not the vehicle is stationary (not moving), based on the PVM camera object information. When the vehicle is stationary, the CPU proceeds to step 825. At step 825, the CPU sets the range of the length (Ya) in the Y-axis positive direction and the Y-axis negative direction of the front side obstacle area to a range from D1 to D4 (i.e., the front side obstacle area is set to include the areas A2, A3 and A4). Thereafter, the CPU proceeds to step 640 shown in FIG. 6 via step 895.

When the vehicle is not stationary (or is moving), the CPU proceeds to step 830 from step 820. At step 830, the CPU sets the range of the length (Ya) to "0". Namely, in this case, the CPU does not set the front side obstacle area. Thereafter, the CPU proceeds to step 640 shown in FIG. 6 via step 895. It should be noted that, when the length (Ya) is set to "0", and thus, the front side obstacle area is not set/provided, the CPU automatically determines that the front side obstacle is not present at step 640 shown in FIG. 6.

When the kind of the object that has been detected based on the PVM camera object information is not the vehicle, the CPU proceeds to step 835 from step 805. At step 835, the CPU determines whether or not the kind of the object that has been detected based on the PVM camera object information is a bicycle. When the kind of the object that has been detected based on the PVM camera object information is the bicycle, the CPU proceeds to step 840. At step 840, the CPU determines whether or not the bicycle is coming close to the host vehicle HV, based on the PVM camera object information. When the bicycle is coming close to the host vehicle HV, the CPU proceeds to step 845. At step 845, the CPU sets the range of the length (Ya) in the Y-axis positive direction and the Y-axis negative direction of the front side obstacle area to a range from D1 to D6 (i.e., the front side obstacle area is set to include the areas A2 to A6). Thereafter, the CPU proceeds to step 640 shown in FIG. 6 via step 895.

When the bicycle is not coming close to the host vehicle HV, the CPU proceeds to step 850 from step 840. At step 850, the CPU determines whether or not the bicycle is stationary (not moving), based on the PVM camera object information. When the bicycle is stationary, the CPU proceeds to step 855. At step 855, the CPU sets the range of the length (Ya) in the Y-axis positive direction and the Y-axis negative direction of the front side obstacle area to a range from D1 to D3 (i.e., the front side obstacle area is set to include the areas A2 and A3). Thereafter, the CPU proceeds to step 640 shown in FIG. 6 via step 895.

When the bicycle is not stationary (or is moving), the CPU proceeds to step 860 from step 850. At step 860, the CPU sets the range of the length (Ya) to "0". Namely, in this case, the CPU does not set the front side obstacle area. Thereafter, the CPU proceeds to step 640 shown in FIG. 6 via step 895.

When the kind of the object that has been detected based on the PVM camera object information is not the bicycle, the CPU proceeds to step 865 from step 835. At step 865, the CPU determines whether or not the kind of the object that has been detected based on the PVM camera object information is a pedestrian. When the kind of the object that has been detected based on the PVM camera object information is the pedestrian, the CPU proceeds to step 870. At step 870, the CPU determines whether or not the pedestrian is coming close to the host vehicle HV, based on the PVM camera object information. When the pedestrian is coming close to the host vehicle HV, the CPU proceeds to step 875. At step 875, the CPU sets the range of the length (Ya) in the Y-axis positive direction and the Y-axis negative direction of the front side obstacle area to a range from D1 to D5 (i.e., the front side obstacle area is set to include the areas A2 to A5). Thereafter, the CPU proceeds to step 640 shown in FIG. 6 via step 895.

When the pedestrian is not coming close to the host vehicle HV, the CPU proceeds to step 880 from step 870. At step 880, the CPU determines whether or not the pedestrian is stationary (not moving), based on the PVM camera object information. When the pedestrian is stationary, the CPU proceeds to step 885. At step 885, the CPU sets the range of the length (Ya) in the Y-axis positive direction and the Y-axis negative direction of the front side obstacle area to a range from D1 to D2 (i.e., the front side obstacle area is set to include the area A2). Thereafter, the CPU proceeds to step 640 shown in FIG. 6 via step 895.

When the bicycle is not stationary (or is moving), the CPU proceeds to step 890 from step 880. At step 890, the CPU sets the range of the length (Ya) to "0". Namely, in this case, the CPU does not set the front side obstacle area. Thereafter, the CPU proceeds to step 640 shown in FIG. 6 via step 895.

It should be noted that, when the CPU proceeds to step 865, if the kind of the object that has been detected based on the PVM camera object information is not a pedestrian (i.e., in this case, is not any of a vehicle, a bicycle, and a pedestrian), the CPU proceeds to step 890 from step 865. Thus, in this case, the CPU does not set the front side obstacle area. Thereafter, the CPU proceeds to step 640 shown in FIG. 6 via step 895.

As has been described, the vehicle control apparatus DS according to the embodiment obtains the "front side target object information", using the specific camera device FSM. The front side target object information includes the information on the blind angle target object that is an object located/present in the blind angle detection area DAA that is lateral to and outside of the target object detection area FWA of the frontward monitoring device FWM that includes the frontward camera (21).

Furthermore, the vehicle control apparatus DS is configured to:
determine the front side obstacle area corresponding to (varying depending on) the kind (and the moving state) of the blind angle target object based on the front side target object information; and
control the driving force of the host vehicle in such a manner that the driving force of the host vehicle is smaller when the (normal) start moving suppression condition is satisfied (step 640 to step 660) than when (or as compared to a case where) the start moving suppression condition is not satisfied (step 670, step 740), wherein the start moving suppression condition includes "the object condition to be satisfied when the object whose kind (and the moving state) corresponding to the determined front side obstacle area is present in the determined front side obstacle area (step 640)" and "the start moving determination condition".

Therefore, the vehicle control apparatus DS can perform the control to decrease the driving force at an appropriate timing for the blind angle target object that the frontward monitoring device can not detect.

The present disclosure should not be limited to the above-described embodiment and the modifications, and may employ various other modifications within the scope of the present disclosure.

For example, the CPU may be configured to perform a first warning sound generation control and/or a first warning display control at step 720, in place of or in addition to the erroneous start moving suppression control.

The first warning sound generation control is a control to generate a voice message to notify the driver of presence of an object in the frontward obstacle area and/or a voice message to urge the driver to operate the brake pedal in place of the acceleration pedal, using the warning ECU 70 and the warning sound generation device 72. The first warning sound generation control may be a control to generate a first warning sound, using the warning ECU 70 and the warning sound generation device 72.

The first warning display control is a control to cause the warning display device 74 to display a display message to notify the driver of presence of an object in the frontward obstacle area and/or a display message to urge the driver to operate the brake pedal in place of the acceleration pedal, using the warning ECU 70 and the warning display device 74. The first warning display control may be a control to cause the warning display device 74 to display a first warning symbol, using the warning ECU 70 and the warning display device 74.

For example, the CPU may be configured to perform a second warning sound generation control and/or a second warning display control at step 740, in place of or in addition to the normal start moving suppression control.

The second warning sound generation control is a control to generate a voice message to notify the driver of presence of an object in the front side obstacle area, using the warning ECU 70 and the warning sound generation device 72. The second warning sound generation control may be a control to generate a second warning sound, using the warning ECU 70 and the warning sound generation device 72.

The second warning display control is a control to cause the warning display device 74 to display a display message to notify the driver of presence of an object in the front side obstacle area, using the warning ECU 70 and the warning display device 74. The second warning display control may be a control to cause the warning display device 74 to display a second warning symbol, using the warning ECU 70 and the warning display device 74.

The specific camera device FSM may include a frontward right side camera and a frontward left side camera, in place of or in addition to the frontward PVM camera 41. The frontward right side camera captures a scene in an area including the blind angle detection area DAA on the right side in front of the vehicle. The frontward left side camera captures a scene in an area including the blind angle detection area DAA on the left side in front of the vehicle. In this case, the PVM•ECU 45 is configured to detect "a position, a kind, and a moving state" of the target object that is present/located in the front side monitoring area, based on image data from the frontward right side camera and the frontward left side camera.

Furthermore, the vehicle control apparatus DS may comprise a right frontward radar device and a left frontward radar device. In this case, the vehicle control apparatus DS detects (obtains) a relative speed V1 of a target object to the host vehicle HV based on radar target object information from the right frontward radar device, the object being present in a front side monitoring area in the right side. The vehicle control apparatus DS detects (obtains) a relative speed V2 of a target object to the host vehicle HV based on radar target object information from the left frontward radar device, the object being present in a front side monitoring area in the left side. Thereafter, the vehicle control apparatus DS may be configured to determine/set the front side obstacle area for a crossing target object (i.e., a crossing pedestrian, a crossing bicycle, and a crossing vehicle) in such a manner that the length in the Y-axis positive direction of the front side obstacle area is longer as the relative speed V1 is higher. Similarly, the vehicle control apparatus DS may be configured to determine/set the front side obstacle area for a crossing target object (i.e., a crossing pedestrian, a crossing bicycle, and a crossing vehicle) in such a manner that the length in the Y-axis negative direction of the front side obstacle area is longer as the relative speed V2 is higher.

The above-described embodiment of the present disclosure can applied to an autonomous control vehicle. In the above-described embodiment, the kind of the target object includes a pedestrian, a bicycle, and a vehicle, but may further include a personal mobility such as an electric scooter, and a Segway (registered trademark). In this case, the kind of the target object is distinguished based on a moving speed that each target object usually has, and the range (especially, the range of the length (Ya) in the Y-axis positive direction or in the Y-axis negative direction) of the side front obstacle may be determined/set for each distinguished kind of the target object.

What is claimed is:

1. A vehicle control apparatus comprising:
a frontward monitoring device, that includes a frontward camera configured to take a picture of a frontward area that is an area in front of a host vehicle, configured to obtain information on an object located in a target object detection area, based on said picture of said frontward area taken by said frontward camera;
a specific camera device, that includes a frontward ultra-wide-angle camera with an angle of view wider than an angle of view of said frontward camera, configured to obtain front side target object information including information on a blind angle target object that is an object located in a blind angle detection area that is an area lateral to and outside of said target object detection area; and
a controller configured to:
when said blind angle target object is detected based on said front side target object information,
specify a kind of said detected blind angle target object, based on said front side target object information;
specify a moving state of said detected blind angle target object, based on said front side target object information;
determine a front side obstacle area, based on said specified kind and said specified moving state; and
determine whether or not a start moving suppression condition is satisfied by determining whether or not a target object condition is satisfied, wherein said target object condition is a condition to be satisfied when a position of said detected blind angle target object is in said determined front side obstacle area; and
control a host vehicle driving force so as to make said host vehicle driving force of when it is determined that said start moving suppression condition is satisfied smaller than said host vehicle driving force of when it is determined that said start moving suppression condition is not satisfied.

2. The vehicle control apparatus according to claim 1, further comprising:
a vehicle speed sensor configured to detect a vehicle speed that is a speed of said host vehicle;
an acceleration pedal operation amount sensor configured to detect an acceleration pedal operation amount of said host vehicle; and
a power train actuator configured to change said driving force of said host vehicle,
wherein, said controller is further configured to:
in a case where said target object condition is satisfied, determine that said start moving suppression condition is satisfied when it is determined that said detected vehicle speed is equal to or lower than a specific vehicle speed threshold and said detected acceleration pedal operation amount is equal to or greater than a specific operation threshold;
when it is determined that said start moving suppression condition is not satisfied, control said power train actuator in such a manner that said host vehicle driving force coincides with a normal driving force that is greater as said detected acceleration pedal operation amount is greater; and
when it is determined that said start moving suppression condition is satisfied, control said power train actuator in such a manner that said host vehicle driving force coincides with a driving force that is smaller than said normal driving force.

3. The vehicle control apparatus according to claim 2, wherein,
  said controller is further configured to:
    determine, using image data of said picture taken by said frontward camera, whether or not a target object is located in a frontward obstacle area that is a rectangular area having a longitudinal direction that is frontward in a front rear axis direction of said host vehicle, wherein a width of said rectangular area is a value in accordance with a width of the host vehicle;
    when it is determined that said target object is located in said frontward obstacle area, determine that an erroneous start moving suppression condition is satisfied when said detected vehicle speed is equal to or lower than said specific vehicle speed threshold, and said detected acceleration pedal operation amount is equal to or greater than an erroneous start moving operation amount threshold that is greater than said specific operation threshold;
    when it is determined that said erroneous start moving suppression condition is satisfied, control said power train actuator in such a manner that said host vehicle driving force coincides with a driving force that is smaller than said normal driving force; and
    when said front side target object information includes information on an intermediate target object that is a target object located between said frontward obstacle area and said blind angle detection area, handle said intermediate target object as said blind angle target object in order to determine whether or not said target object condition is satisfied.

* * * * *